(12) United States Patent  (10) Patent No.: US 6,290,060 B1
Burtch  (45) Date of Patent: Sep. 18, 2001

(54) CARRIER AND DISPENSER DEVICE FOR PLANAR ITEMS

(76) Inventor: Richard A. Burtch, 1224 Lincoln Ct. Ave., Atlanta, GA (US) 30329-1825

( * ) Notice: Subject to any disclaimer, the term of this patent is extended or adjusted under 35 U.S.C. 154(b) by 0 days.

(21) Appl. No.: 09/570,556

(22) Filed: May 12, 2000

(51) Int. Cl.[7] .................................................. B65D 85/57
(52) U.S. Cl. ...................................... 206/312; 206/308.1
(58) Field of Search ................................ 206/308.1, 309, 206/311, 312, 232

(56) References Cited

U.S. PATENT DOCUMENTS

| | | |
|---|---|---|
| 4,463,849 | 8/1984 | Prusak et al. . |
| 5,360,107 | 11/1994 | Chasin et al. . |
| 5,372,253 * | 12/1994 | O'Brien et al. ...................... 206/312 |
| 5,421,452 | 6/1995 | Hybiske . |
| 5,450,953 * | 9/1995 | Reisman ............................... 206/310 |
| 5,655,656 | 8/1997 | Gottlieb . |
| 5,715,970 * | 2/1998 | LeMaitre .............................. 206/312 |
| 5,732,491 | 3/1998 | Burtch . |
| 5,748,608 | 5/1998 | Spector . |
| 5,772,022 | 6/1998 | Renna . |
| 5,908,109 | 6/1999 | Muto . |
| 6,032,795 * | 3/2000 | Ehrlund et al. ....................... 206/312 |

* cited by examiner

*Primary Examiner*—David T. Fidei
(74) *Attorney, Agent, or Firm*—Larson & Taylor, PLC

(57) ABSTRACT

A carrier device for a planar item such as a CD is made from a single, four panel, paperboard blank. A cover sheath is formed by first and second panels of the blank which are secured together so as to define a space therebetween. A carrier member is slidably received in the space for sliding movement between a storage position wherein the carrier member is nested within the sheath and a dispensing position wherein the carrier member extends outwardly of the sheath so that a planar item carried by the carrier member is displayed and can be removed from the device. The carrier member is formed by third and fourth panels of the blank which are secured together by an adhesive. The third panel includes an opening therein for receiving a planar item to be carried and dispensed. The device further comprises cooperating end stops formed on the carrier member and the sheath for limiting the sliding movement of the carrier member.

20 Claims, 3 Drawing Sheets

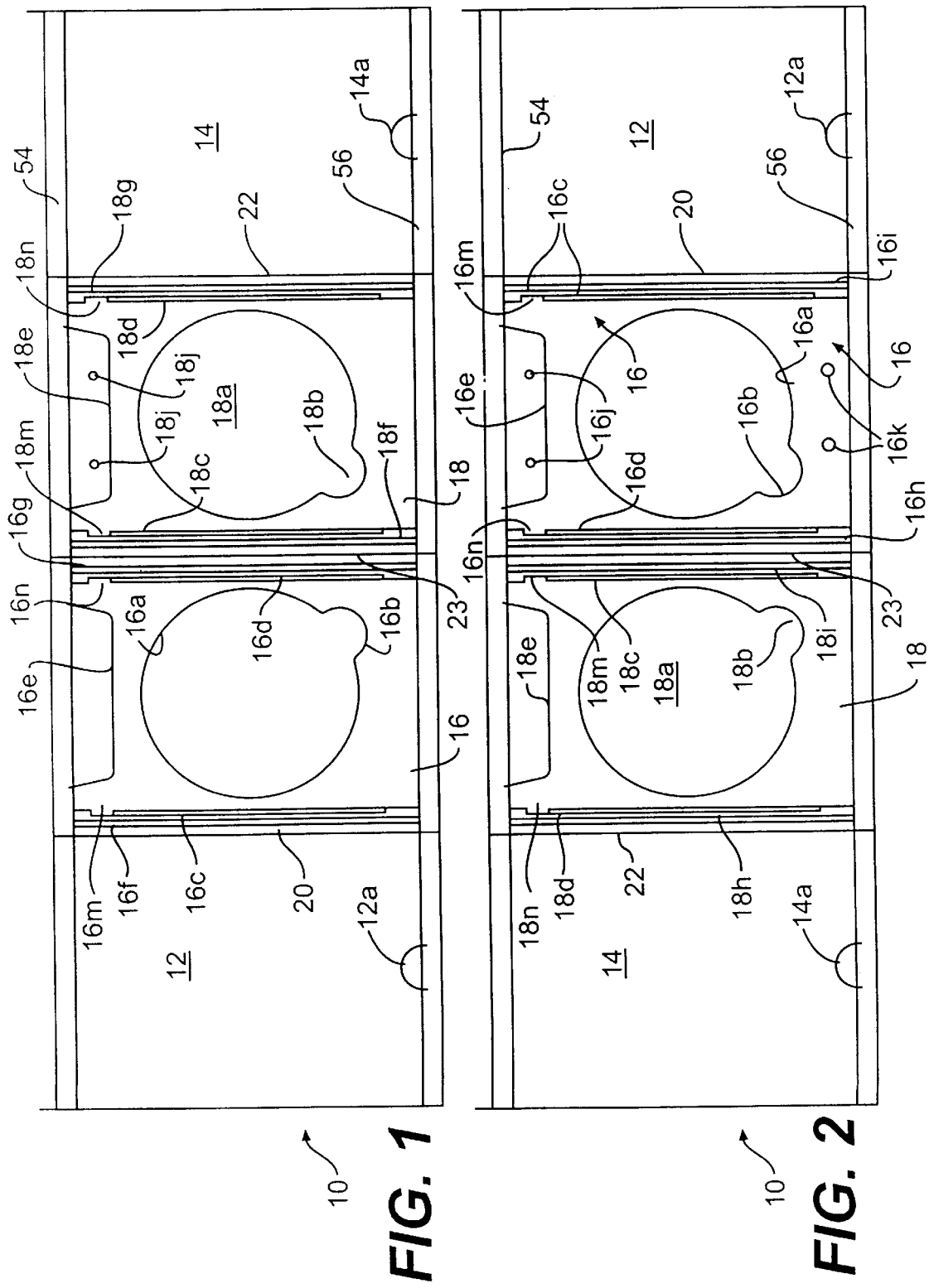

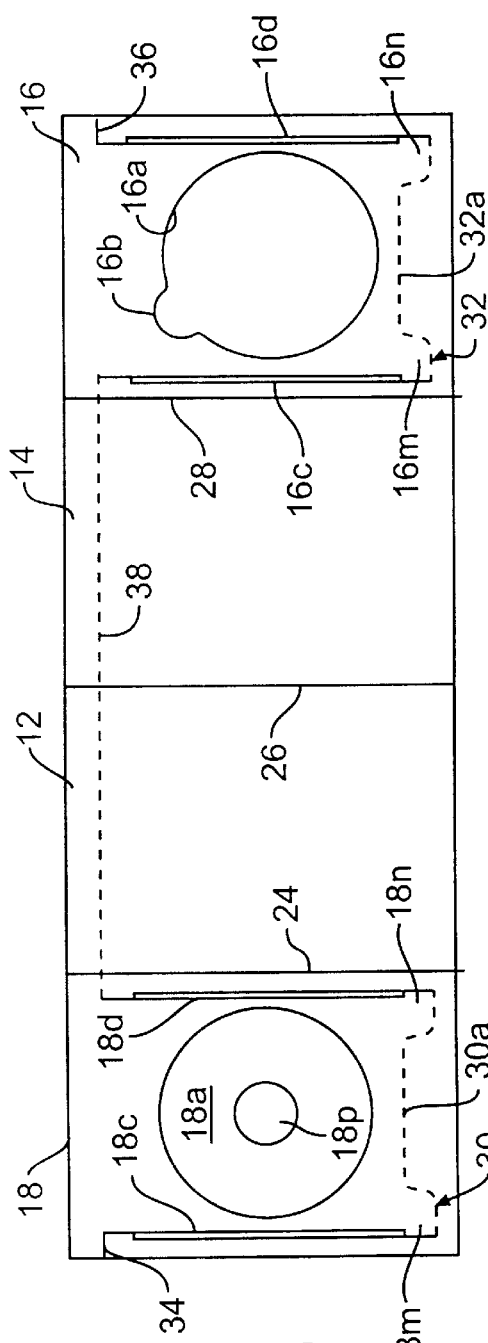
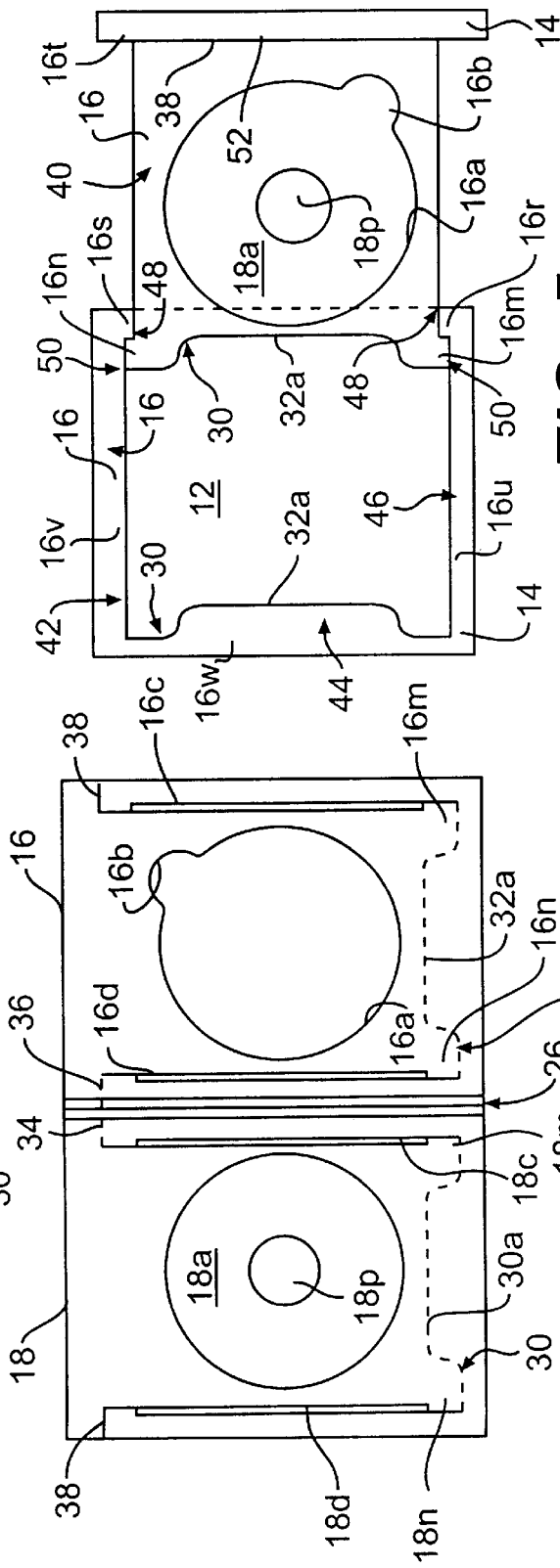

CARRIER AND DISPENSER DEVICE FOR PLANAR ITEMS

FIELD OF THE INVENTION

The present invention relates to carrier devices and cases for planar items such as compact discs (CDs), credit cards and the like.

BACKGROUND OF THE INVENTION

CDs are normally carried in hinged plastic cases often referred to as "jewel boxes" and while these cases or carriers serve their purpose, there are disadvantages to such jewel boxes, particularly regarding cost. This has led to consideration in this art of a number of different alternatives for carrying out this purpose and related purposes.

Some of these alternatives to which reference was made above are discussed in the patented art. Patents of possible interest include the following U.S. patents: U.S. Pat. No. 5,748,608 to Spector; U.S. Pat. No. 5,772,022 to Renna; U.S. Pat. No. 5,908,109 to Muto; U.S. Pat. No. 4,463,849 to Prusak et al; U.S. Pat. No. 5,360,107 to Chasin et al; U.S. Pat. No. 5,421,452 to Hybiske et al; U.S. Pat. No. 5,655,656 to Gottlieb; and U.S. Pat. No. 5,732,491 to Burtch.

The Spector patent discloses a protective package for a CD in an album format. The package includes hinged front and rear panels. A face panel secured to the rear panel contains a circular opening creating a well for holding the CD. The front panel forms a cover for protecting the CD. The Renna patent discloses a disc storage case formed from a single sheet comprising a support panel and a hinged cover panel. The disc is retained on the support panel by folded side panels. The Muto patent discloses a receiver for a disc comprising a disc receiving portion and a hinged lid portion. The disk receiving portion may comprise a smooth base plate or a base plate with a circular concave portion sized to hold the disc. A silicone resin layer is laminated on the disc receiving portion of the base plate. The Prusak et al patent discloses a video disc caddy comprising a record retaining spine removably received inside an outer protective cover. The spine includes a circular record receiving opening and a pair of latching fingers which are selectively snapped into respective pockets to hold the record/spine assembly in place. The package allows a record to be loaded into a record player and removed therefrom without having to touch the record. The Chasin et al patent discloses a compact disc box with a reciprocating drawer. The drawer includes a recessed storage platform and spindle mechanism. The box can be constructed from a single mold during an injection process. The Hybiske patent discloses a data disc case comprising a tray section and a pocket section into which the tray section is slidably mounted. The tray and pocket are each constructed from a single piece of paperboard. A catch tab and spring tab work together to prevent the tray from sliding completely out of the pocket. The Gottlieb patent discloses a paperboard package for a CD comprising an outer container and an inner sleeve capable of being slid into the outer container. The inner sleeve is provided with a disc gripping flap to frictionally hold an edge of the CD. The Burtch patent discloses an erectable periscoping display device for planar items such as CDs and a blank therefor made from paperboard or the like.

SUMMARY OF THE INVENTION

In accordance with the invention, there are provided a carrier device, and a blank for making the device, which afford important advantages over the prior art. The device and thus, of course, the blank, are made of paper, cardboard, paperboard, laminates of the same, hereinafter referred to as paperboard, and the device is completely constructed from a single blank so that the device is very simple and inexpensive to make. Despite its simplicity and low cost, the device of the invention provides a highly effective carrying and display and/or dispensing functions wherein a planar item such as a CD, credit card or the like is shielded and protected within a cover or sheath in a carrying or storage mode, and can be readily exposed for display or dispensing purposes by pulling out or pushing out a sliding carrier member or tray which is disposed within the cover or sheath and which is adapted to carry the planar item.

In accordance with a first aspect of the invention, there is provided a carrier device for a planar item, the device comprising: a cover sheath formed by first and second panels secured together so as to define a space therebetween; and a carrier member slidably received in said space for sliding movement between a storage position wherein the carrier member is nested within the sheath and a dispensing and/or display position wherein the carrier member extends outwardly of the sheath so that a planar item carried by the carrier member is displayed and can be removed from the device, the carrier member being formed by third and fourth panels secured together, the third panel comprising an opening therein for receiving a planar item to be carried, and the device further comprising stop means for limiting the sliding movement of the carrier member.

In one preferred embodiment, particularly useful with thicker planar items such as CDs, the fourth panel includes a debossed area in registration with said opening in said third panel so that the opening and the debossed area cooperate to form a carrier pocket. Advantageously, the opening and debossed area are of a common size and shape. In one implementation, the debossed area includes a central opening therein.

In a preferred embodiment, the sheath includes first and second inner side walls defining a channel in which said carrier member slides and the stop means comprises first and second projections on opposite sides of the carrier member, and first and second projections on said inner side walls which project inwardly into the channel from the inner side walls from opposite sides of the channel and which cooperate with the projections of the carrier member to limit the sliding movement of the carrier member.

The device preferably further comprises an inner end stop at one end thereof for further limiting the sliding movement of the carrier member.

In one preferred embodiment, the opening in the third panel of the carrier member is substantially circular in shape so as to receive CDs, other discs and the like. The opening preferably includes a finger grip portion. In an alternative preferred embodiment, the opening in the third panel is substantially rectangular in shape so as to receive a credit card or the like therein.

In accordance with a further aspect of the invention, a blank is provided for making a carrier and dispensing device for planar items, said blank comprising: first, second, third and fourth panels joined together in sequence along separation lines, the panels each including parallel opposed sides, two of the panels including a central area and first and second elongate parallel cutouts extending parallel to the sides of the respective panel and flanking the respective central area thereof, the cutouts each having inner and outer opposite sides and each of first and second cutouts further including an inner cut line forming an extension of, and extending outwardly in a first direction from, the inner side of the respective cutout and an outer cut line forming an extension of, and extending outwardly in a second, opposite direction from, the outer side of the respective cutout, so as to form cooperating stops adjacent to the inner and outer cut lines when the blank is assembled, one of said two panels including a central cutout formed in the respective central area thereof for, in use of a device assembled from the blank, receiving a planar item.

Preferably, the other of the two panels includes a central debossed area in the respective central area thereof of a size and shape so as to cooperate with the central cutout to form a common pocket for, in use of a device assembled from the blank, receiving a planar item therein.

Preferably, the blank further comprises a transverse line of weakness extending between respective terminal points of the outer cut lines of the first and second cutouts of each of the two panel for, in use in the assembly of the device, assisting in separation of the respective central areas thereof. Preferably, the transverse line of weakness includes a central inwardly extending portion of a flattened U-shape. Preferably, further transverse lines of weakness extend laterally outwardly from respective terminal points of the inner cut lines of the first and second cutouts of each of the two panels, and extensions of these further lines of weakness extend transversely across the other two panels of the first, second, third and fourth panels for, in use in assembly of the device, further assisting in separation of the central areas of the two panels for the remainder of the blank.

In one advantageous embodiment, the debossed area includes a central opening therein.

The central opening preferably includes a peripheral finger grip portion. In one preferred implementation, the central opening is circular in shape so as to permit receipt therein of a circular disc. In an alternative embodiment, the central opening is rectangular in shape.

Advantageously, each of the two panels includes a centrally disposed, inwardly extending portion located at one end of the respective central area of the respective panel and formed by a cut line so as to be separable from the respective central area. The inwardly extending portion advantageously has a flat, transversely extending innermost end.

Further features and advantages of the present invention will be set forth in, or apparent from, the detailed description of preferred embodiments thereof which follows.

BRIEF DESCRIPTION OF THE DRAWINGS

FIGS. 1 and 2 are top plan view and a bottom plan view, respectively, of a blank for a carrier device in accordance with a first preferred embodiment of the invention;

FIG. 3 is a top plan view of a blank in accordance with a further preferred embodiment of the invention;

FIG. 4 is a top plan view of the blank of FIG. 3 showing an intermediate stage in the construction of the corresponding carrier device;

FIG. 5 is a top plan view, partially broken away, showing a carrier device constructed in accordance with the embodiments of FIGS. 3 and 4.

DESCRIPTION OF THE PREFERRED EMBODIMENTS

Figure 6:
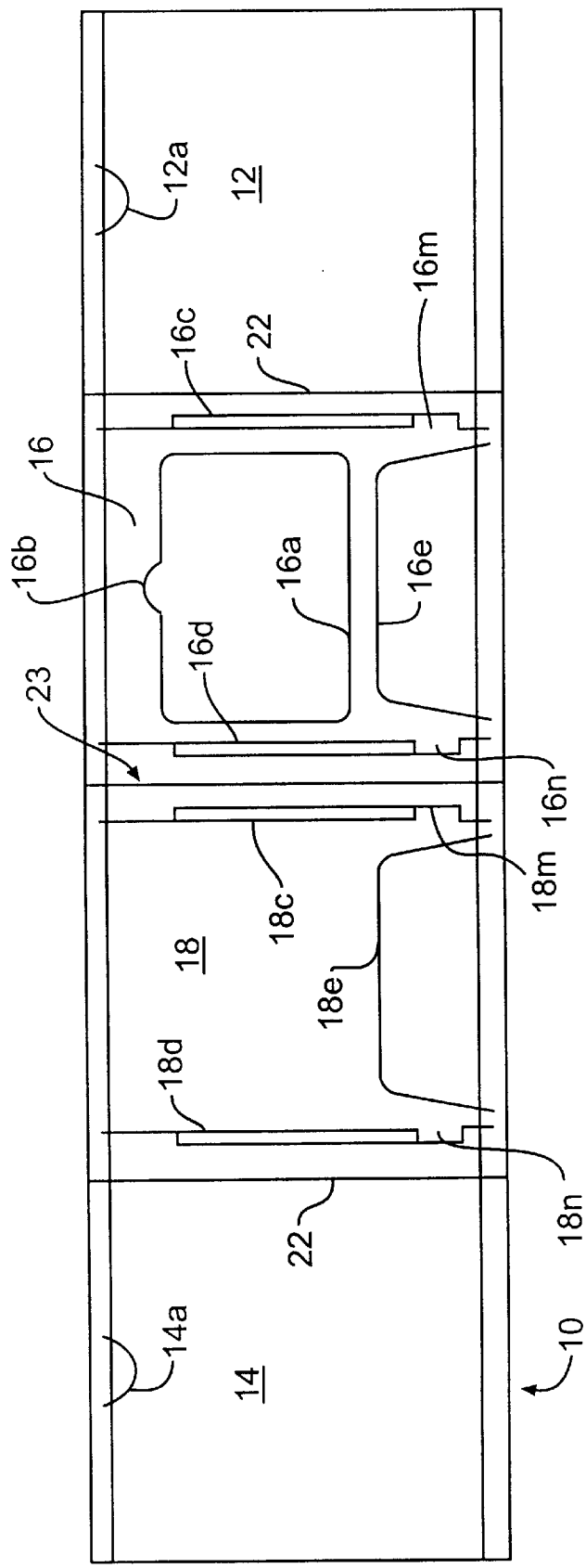
FIG. 6 is a top plan view of a blank in accordance with yet another embodiment of the invention.

Referring to FIGS. 1 and 2, there is shown a first preferred embodiment of a blank for a carrier and dispenser device in accordance with the invention. The blank, which is generally denoted 10, includes end panels 12 and 14 and intermediate panels 16 and 18. It will be appreciated that because FIGS. 1 and 2 respectively show the front and back side of the blank, the sequence of the panels is reversed in the two figures. It will also be understood that the words front and back, and top and bottom, are merely referenced to FIGS. 1 and 2, and that the orientation of the blank 10 could be changed from that shown. Moreover, as will appear, the "intermediate" panels can be located at the ends of the blank and the "end" panels at the intermediate locations.

The end panels 12 and 14, which form the outside or cover panels in the assembled device, are generally rectangular in shape and include U-shaped scored cut lines or lines of weakness 12a and 14a near one edge thereof (i.e., the lower edge as viewed in FIGS. 1 and 2). The end panels 12 and 14 are joined to respective intermediate panels 16 and 18 by respective scored fold lines 20 and 22. It is noted because of the thickness of the paperboard used in this embodiment, the use of a scored fold line, wherein a line is cut into the paperboard to form a foldable hinge, is preferred, although different fold lines can be employed depending on the application, the type of paper used, the paper thickness, and the like.

A reversed score line or microperforated line 23 joins (i.e., separates) panels 16 and 18. As discussed above, line 23 is intended to ultimately form a separation line between panels 16 and 18, i.e., a line along which panels 16 and 18 are separated.

The first intermediate panel 16 includes a central circular cutout 16a having a finger grip portion 16b at the peripheral edge thereof and a pair of elongate rectangular cutouts 16c and 16d located near, and extending parallel to, the lateral edges of panel 16. A flattened U-shaped cut line 16e is provided at the top of panel 16.

As shown in FIG. 1, the front of panel 16 also includes a pair of elongate deposits or lines 16f and 16g of a suitable glue or other adhesive extending along opposite lateral edges between the edges and elongate rectangular cutouts 16c and 16d. As shown in FIG. 2, the back of panel 16 also includes a pair of elongate glue deposits or lines 16h and 16i. As is also shown in FIG. 2, spaced adhesive spots 16i and 16k, i.e., spots of glue or the like, are provided in top and bottom areas of panel 16, respectively. Elbows or projections 16m and 16n are formed by cut lines adjacent to the top of elongate cutouts 16c and 16d.

Panel 18 includes a central circular debossed or recessed area 18a having a projecting finger grip portion 18b at the circumference or periphery thereof. As illustrated, the debossed area 18b is preferably the mirror image of cutout area 16a and is of substantially the same size and shape. Panel 18 is otherwise similar to panel 16 and also includes similar elongate rectangular cutouts 18c and 18d, a similar flattened U-shaped score line 18e, and similar elbows 18m and 18n.

Panel 18 also includes elongate deposits 18f and 18g adjacent to elongate cutouts 18c and 18d on one side of panel 18 (FIG. 1) and further elongate glue deposits 18h and 18l adjacent to elongate cutouts 18c and 18d on the other side (FIG. 2). As shown in FIG. 1, two further adhesive spots 18j are provided in an upper area of panel 18 within cut line 18e.

The manner in which blank 10 is assembled to form a carrier device is described below after a further embodiment of the invention is first described.

A second preferred embodiment of the invention is shown in FIG. 3. This embodiment is similar to that of FIGS. 1 and 2 and corresponding elements of the panels have been given the same reference numerals. The adhesive deposits (e.g., lines and spots) shown in FIGS. 1 and 2 have been eliminated to simplify the drawing in FIG. 3 but similar adhesive deposits would be used. The lines of separation between the panels 18 and 12, panels 12 and 14 and panels 14 and 16 are denoted 24, 26 and 28. Line of separation 26 corresponds to line 23 of FIGS. 1 and 2 and, as indicated, is intended to serve as a line of severance or separation while lines 24 and 26 are essentially fold lines.

As will be seen, in this embodiment, panels 16 and 18 are the end panels and panel 12 and 14 are the intermediate panels but it will be understood this is an arbitrary choice and that the panels could be in the same sequence as in FIGS. 1 and 2. Further, the blank is "upside down" relative to the blank of FIGS. 1 and 2, although again this is an arbitrary choice. Also, in the embodiment of FIG. 3, debossed area 18a includes a central opening 18p and the finger grip portion 18b has been eliminated. However, these are minor differences and the important distinctions between the two embodiments are discussed below.

As illustrated, shaped lines of weakness 30 and 32 join the terminal points of cut lines coextensive with, i.e., forming extensions of, the outer edges of rectangular cutouts 18c and 18d, and 16c and 16d, respectively. As illustrated, these perforated lines 30 and 32 extend laterally inwardly, orthogonally to the cut lines, from the respective terminal points thereof and include an inwardly projecting portion 30a and 32a which is of flattened U-shape or a trapezoidal shape, and which, as will appear, generally corresponds to the area within cut lines 16e and 18e of the embodiment of FIGS. 1 and 2.

As shown, further perforated lines 34 and 36 extend laterally outwardly from terminal points of cut lines coextensive with inner edges of cutouts 18c and 16d while another perforated line 38 extends between the terminal points of cut lines coextensive with the inner edges of elongate rectangular cutouts 18d and 16c.

The devices of the embodiment of FIGS. 1 and 2 and the embodiment of FIG. 3 are assembled in a similar manner, although there are important differences between the assembly of the two devices as will be discussed below. The manner of assembly of the device of FIG. 3 will be discussed with reference to FIGS. 4 and 5 and then the manner of assembly of the embodiment of FIGS. 1 and 2 will be discussed mainly with respect to the aforementioned differences.

Referring to FIG. 4, a first step or stage in the assembly is shown wherein panels 18 and 16 are folded over, along respective fold lines 24 and 28, on top of panels 12 and 14. In this step, the panels 18 and 16 are glued to respective panels 12 and 14 by glue deposits corresponding to elongate glue deposits discussed above in connection with FIGS. 1 and 2. Next, the sandwich panels 18 and 12 and the sandwich panels 16 and 14 shown in FIG. 4 are separated along line 26 and folded over onto each other so as to produce a four panel sandwich with panels 12 and 14 on the outside. In this sandwich, panels 16 and 18 face each other on the inside such that debossment area 18a is adjacent to opening 16a and cooperates therewith to form an internal pocket or receiving space within the four panel sandwich. At this stage, with panels 12 and 14 on the outside so as to serve as cover panels, the external appearance of the device is viewed in plan from either side is a sample rectangle corresponding to shape of panels 12 and 14 and thus a drawing of the outside appearance at this stage has been omitted.

Referring to FIG. 5, the final stage of the assembly, i.e., the completed device, is shown. In FIG. 5, the outer (upper) panel 14 has been mostly broken away to show the internal panel 16 which, of course, overlies and is joined to panel 18. As shown, a sliding carrier member or carrier tray 40 of the device is created by separating the parts along the perforated lines 30, 32 of panels 18 and 16 and perforated lines 34, 36 and 38 of all four panels and leaving a sheath member 42 formed by portions of all four panels and having panels 14 and 12 as the outside sheath-forming layers.

The first separation frees up the inner end of carrier 40, leaving an end area 16w which, with matching, underlying area of panel 18 (not shown), forms an internal end wall 44 of sheath 42 that is secured to, and acts as a spacer between, the outer panels 12 and 14. As will appear end wall 44 also acts as an end stop.

Further, side areas 16u and 16v are created by slots 16c, 18c and 16d, 18d which, with matching, underlying areas of panel 18 (not shown), form side parts or side walls 46 of sheath 42 that are similarly secured to, and act as spacers between, panels 12 and 14. As illustrated, this also creates stop portions 16r and 16s which, together with the matching underlying area of panel 18 (not shown), form end stops 48 that cooperate with elbows or projections 50 on carrier 46 to limit the movement of carrier 40 so as to prevent carrier 40 from exiting the space formed between panels 12 and 14, i.e., from being completely pulled our from the sheath 42.

The other separation, i.e., that along perforated lines 34, 36 and 38 permits the separation of carrier 40 from sheath 42 at the other end thereof. In particular, an end portion or pull element 52 is formed at the other end of carrier comprising a sandwich of an end portion of panel 14 (a part of which is shown in FIG. 5) and matching, underlying end portion 16t of panel 16 and matching, underlying portions of panels 18 and 12 (not shown).

In the operation of the device of FIG. 5, slide or carrier member 16 can be slid in and out of sheath 16 to reveal or display and dispense a compact disc or the like (not shown). The extended or dispensing state of carrier member 16 is shown in FIG. 5. As indicated above, cooperating stops 50 and 48 limit the movement of carrier member 40. End wall 44, formed by the flattened U-shaped portion 16w of panel 16 and the matching, underlying portion of panel 18, acts as an end to limit the inward movement of carrier member 40 as well as spacer for preventing "pinching" of carrier member 40 within sheath 42.

As indicated above, the embodiment of FIGS. 1 and 2 is assembled in a manner very similar to that of FIG. 3. The main difference is that the former does not use perforated lines to provide the separation described above but instead after the panels are joined together as described above to form a four panel sandwich of panels 12, 16, 18 and 14 (or panels 18, 14, 16 and 12), the resultant sandwich is cut along cut lines 54 and 56, thus freeing up a carrier member formed by panels 16 and 18. An end wall or end stop generally corresponding to the flattened U-shaped area 44 of FIG. 5 is formed by matching cut lines 16e and 18e and cut line 54. In addition, cutouts for enabling gripping of the carrier member formed by panels are produced by matching cut lines 12a and 14a and cut line 56 so that when cut line 56 is effected, half moon portions of panels 12 and 14 are cut out. These portions are discarded so as to expose underlying portions of panels 16 and 18 for gripping. This manner of gripping of the carrier member, of course, contrasts with the pull portion or end gripping portion 52 of the embodiment of FIG. 5. Overall, the device is otherwise basically the same and the basic manner in which a disc or the like is stored or carried and then displayed for dispensing is the same.

Referring to FIG. 6, yet another embodiment of the invention is shown. This embodiment is similar to the "cut" embodiment of FIGS. 1 and 2 (in contrast to the "perforate" embodiment of FIG. 3) and corresponding elements have been given the same reference numerals. However, it will, of course, be understood that the techniques of the latter are also applicable to this embodiment. FIG. 6 generally corresponds to FIG. 2 but is "upside down" so as to again emphasize the point that the terms top and bottom and front and back are used in the Specification in reference to a particular drawing figure and not in reference to the finished device which can be oriented in various ways. The embodiment of FIG. 6 mainly differs from those described above in that a rectangular opening 16a is provided rather than a circular one. A finger grip area is indicated at 16b. The embodiment of FIG. 6 is intended to be used with a credit card or a like planar rectangular element and depending on the thickness of the card, the debossed area 18a of FIGS. 1 to 5 can be eliminated as shown in FIG. 6 and, optionally, replaced, e.g., by a surface grain finish or the like.

Although the invention has been described above in relation to preferred embodiments thereof, it will be understood by those skilled in the art that variations and modifications can be effected in these preferred embodiments without departing from the scope and spirit of the invention.

What is claimed:

1. A carrier device for a planar item, said device comprising:
   a cover sheath formed by first and second panels secured together so as to define a space therebetween;
   and a carrier member slidably received in said space for sliding movement between a storage position wherein said carrier member is nested within said sheath and a dispensing position wherein said carrier member extends outwardly of said sheath so that a planar item carried by said carrier member is displayed and can be removed from the device, said carrier member being formed by third and fourth panels secured together, said third panel comprising an opening therein for receiving a planar item to be carried, said device further comprising stop means for limiting the sliding movement of said carrier member.

2. A carrier device according to claim 1 wherein said fourth panel includes a debossed area in registration with said opening in said third panel so that said opening and said debossed area cooperate to form a carrier pocket.

3. A carrier device according to claim 1 wherein said opening and said debossed area are of a common size and shape.

4. A carrier device according to claim 3 wherein said debossed area includes a central opening therein.

5. A carrier device according to claim 1 wherein said sheath includes first and second inner side walls defining a channel in which said carrier member slides and wherein said stop means comprises first and second projections on opposite sides of said carrier member and first and second projections on said side inner walls which project inwardly into said channel from said inner side walls from opposite sides of said channel and which cooperate with said projections of said carrier member to limit the sliding movement of the carrier member.

6. A carrier device according to claim 5 wherein said device further comprises an inner end stop at one end thereof for further limiting the sliding movement of the carrier member.

7. A carrier device according to claim 1 wherein said opening in said third panel of said carrier member is substantially circular in shape.

8. A carrier device according to claim 7 wherein said opening includes a finger grip portion.

9. A carrier device according to claim 1 wherein said opening in said third panel is substantially rectangular in shape.

10. A blank for making a carrier and dispensing device for planar items, said blank comprising:
    first, second, third and fourth panels joined together in sequence along separation lines, said panels each including parallel opposed sides, two of said panels including a central area and first and second elongate parallel cutouts extending parallel to the sides of the respective panel and flanking the respective central area thereof, said cutouts each having inner and outer opposite sides and each of first and second cutouts further including an inner cut line forming an extension of, and extending outwardly in a first direction from, the inner side of the respective cutout and an outer cut line forming an extension of and extending outwardly in a second, opposite direction from, the outer side of the respective cutout, so as to form cooperating stops adjacent to said inner and outer cut lines when the blank is assembled, one of said two panels including a central cutout formed in the respective central area thereof for, in use of a device assembled from the blank, receiving a planar item.

11. A blank according to claim 10 wherein the other of said two panels includes a central debossed area in the respective central area thereof of a size and shape so as to cooperate with the central cutout to form a common pocket for, in use of a device assembled from the blank, receiving a planar item therein.

12. A blank according to claim 10 wherein further comprising a transverse line of weakness extending between respective terminal points of the outer cut lines of the first and second cutouts of each of the two panels for, in use in the assembly of the device, assisting in separation of the respective central areas thereof.

13. A blank according to claim 12 wherein said transverse line of weakness includes a central inwardly extending portion of a flattened U-shape.

14. A blank according to claim 13 wherein further transverse lines of weakness extend laterally outwardly from respective terminal points of the inner cut lines of the first and second cutouts of each of said two panels, and wherein extensions of said further lines of weakness extend transversely across the other two panels of said first, second, third and fourth panels for, in use in assembly of the device, further assisting in separation of said central areas of said two panels for the remainder of the blank.

15. A blank according to claim 11 wherein said debossed area includes a central opening therein.

16. A blank according to claim 10 wherein said central opening includes a peripheral finger grip portion.

17. A blank according to claim 10 wherein said central opening is circular in shape so as to permit receipt therein of a circular disc.

18. A blank according to claim 10 wherein said central opening is rectangular in shape.

19. A blank according to claim 10 wherein each of said two panels includes a centrally disposed inwardly extending portion located at one end of the respective central area of the respective panel and formed by a cut line so as to be separable from the respective central area.

20. A blank according to claim 19 wherein inwardly extending portion has a flat, transversely extending innermost end.

* * * * *